(12) United States Patent
Saracchini et al.

(10) Patent No.: US 11,875,455 B2
(45) Date of Patent: *Jan. 16, 2024

(54) SINGLE-PASS OBJECT SCANNING

(71) Applicant: Apple Inc., Cupertino, CA (US)

(72) Inventors: Rafael Saracchini, San Jose, CA (US); Tobias Rick, Mountain View, CA (US); Zachary Z. Becker, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/095,180

(22) Filed: Jan. 10, 2023

(65) Prior Publication Data

US 2023/0162438 A1    May 25, 2023

Related U.S. Application Data

(63) Continuation of application No. 17/171,434, filed on Feb. 9, 2021, now Pat. No. 11,580,692.

(Continued)

(51) Int. Cl.
| | |
|---|---|
| *G06T 17/00* | (2006.01) |
| *G06T 7/20* | (2017.01) |
| *G06T 7/579* | (2017.01) |
| *G06T 19/00* | (2011.01) |
| *H04N 23/60* | (2023.01) |
| *H04N 23/63* | (2023.01) |

(52) U.S. Cl.
CPC ............... *G06T 17/00* (2013.01); *G06T 7/20* (2013.01); *G06T 7/579* (2017.01); *G06T 19/006* (2013.01); *H04N 23/633* (2023.01); *H04N 23/64* (2023.01); *G06T 2200/24* (2013.01); *G06T 2207/10028* (2013.01); *G06T 2207/30168* (2013.01); *G06T 2207/30244* (2013.01)

(58) Field of Classification Search
None
See application file for complete search history.

(56) References Cited

U.S. PATENT DOCUMENTS

| | | |
|---|---|---|
| 8,625,854 B2 | 1/2014 | Valkenburg et al. |
| 9,053,571 B2 | 6/2015 | Shotton et al. |

(Continued)

OTHER PUBLICATIONS

Pollefeys, Marc: "Visual 3D Modeling from Images"; Universtiy of North Carolina—Chapel Hill, USA, Tutorial Notes, pp. 1-143, Aug. 21, 2014.

(Continued)

*Primary Examiner* — Frank S Chen
(74) *Attorney, Agent, or Firm* — Thompson Hine LLP

(57) ABSTRACT

Various implementations disclosed herein include devices, systems, and methods that generates a three-dimensional (3D) model based on a selected subset of the images and depth data corresponding to each of the images of the subset. For example, an example process may include acquiring sensor data during movement of the device in a physical environment including an object, the sensor data including images of a physical environment captured via a camera on the device, selecting a subset of the images based on assessing the images with respect to motion-based defects based on device motion and depth data, and generating a 3D model of the object based on the selected subset of the images and depth data corresponding to each of the images of the selected subset.

20 Claims, 7 Drawing Sheets

Related U.S. Application Data

(60) Provisional application No. 62/981,607, filed on Feb. 26, 2020.

(56) References Cited

U.S. PATENT DOCUMENTS

| | | |
|---|---|---|
| 9,438,878 B2 | 9/2016 | Niebla, Jr. et al. |
| 2005/0111753 A1 | 5/2005 | Peleg et al. |
| 2013/0215233 A1 | 8/2013 | Wang et al. |
| 2013/0278754 A1 | 10/2013 | Oh |
| 2013/0308036 A1 | 11/2013 | Peng |
| 2014/0376792 A1 | 12/2014 | Matsuzaki et al. |
| 2016/0005211 A1 | 1/2016 | Sarkis et al. |
| 2019/0028637 A1 | 1/2019 | Kolesov et al. |
| 2019/0122378 A1* | 4/2019 | Aswin .................... G06N 3/045 |
| 2019/0208177 A1 | 7/2019 | Koyama et al. |
| 2021/0158937 A1 | 5/2021 | Wu et al. |
| 2021/0240986 A1 | 8/2021 | Gurajapu et al. |

OTHER PUBLICATIONS

Locher, Alex, Perdock, Michal, Riemenschneider, Hayko and Gool, Luc Van; "Mobile Phone and Cloud—a Dream Team for 3D Reconstruction"; pp. 1-8; May 26, 2016.

* cited by examiner

SINGLE-PASS OBJECT SCANNING

CROSS-REFERENCE TO RELATED APPLICATIONS

This Application is a continuation of U.S. application Ser. No. 17/171,434 filed Feb. 9, 2021, and which claims the benefit of U.S. Provisional Application Ser. No. 62/981,607 filed Feb. 26, 2020, each of which is incorporated by reference herein in its entirety.

TECHNICAL FIELD

The present disclosure generally relates to generating three-dimensional geometric representations of physical environments, and in particular, to systems, methods, and devices that generate geometric representations based on depth information detected in physical environments.

BACKGROUND

Physical environments and objects therein have been modeled (e.g., reconstructed) by generating three-dimensional (3D) meshes, utilizing 3D point clouds, and by other means. The reconstructed meshes represent 3D surface points and other surface characteristics of the physical environments' floors, walls, and other objects. Such reconstructions may be generated based on images and depth measurements of the physical environments, e.g., using RGB cameras and depth sensors.

Existing techniques for generating 3D models based on images of a physical environment and depth information detected in the physical environment may be inaccurate and inefficient using a mobile device, for example, based on a user capturing photos or video or other sensor data while walking about in a room. Moreover, existing techniques may fail to provide sufficiently accurate and efficient object detection in real time environments.

SUMMARY

Various implementations disclosed herein include devices, systems, and methods that generate a three-dimensional (3D) model using a selected subset of image data and depth data. The 3D model is generated based on images of a physical environment, depth information detected in the physical environment, and other information for tracking the devices/depth camera's particular position and orientation. It may be desirable to exclude images that include motion-based defects and/or include only a selected particular set of images (e.g., keyframes) for various reasons. Doing so may provide a more useful, realistic, or physically meaningful model of an object.

Some implementations of this disclosure involve an exemplary method of generating a 3D model of an object based on a selected subset of images and depth data corresponding to each of the images of the selected subset. The exemplary method initially involves acquiring sensor data during movement of the device in a physical environment including an object, the sensor data including images of a physical environment captured via a camera on the device. For example, a user moves a device (e.g., a mobile device) around an object (e.g., a shoe on top of a table) in a physical environment to capture images of the object from different sides. In some implementations, the sensor data may include depth data and motion sensor data. In some implementations, during movement of the device, a user interface may display the captured environment that includes the object and provide a feedback mechanism. For example, a flashlight-type highlight can show the areas that have already been captured for the particular object (e.g., lighter shaded areas for the pixels that are captured, and darker shaded areas for the areas that have not been sufficiently captured for reconstruction). In some implementations, the user interface can display a preliminary 3D model of the object. For example, a picture-in-picture display of another window can display to the user a 3D model reconstruction in a live preview screen as the user is capturing live video and as the live video is streaming on the main viewing screen.

The exemplary method further involves selecting a subset of the images (e.g., selecting images to use as "keyframes") based on assessing the images with respect to motion-based defects based on device motion and depth data. In some implementations, assessing motion-based defects involves estimating projection speed of particular pixels. For example, pixels corresponding to an identified object, a 3D bounding box, a center of the camera view, or the like, can be analyzed for motion-based defects at each frame. In some implementations, projection speed may be determined by determining a pixel's speed given the current motion of the camera and the distance of the pixel from the camera. Additionally, or alternatively, in some implementations, the images may additionally be selected based on having been captured from within a desired distance range and/or within an angle range. Additionally, or alternatively, in some implementations, images may be selected to ensure that the images include the object or particular object features (e.g., an edge of an object, a closest point of the object to the camera, a recognized mark such as a brand name and/or symbol, or the like). In some implementations, a picture-in-picture preview may be displayed during the movement of the device based on the selected subset of the images.

The exemplary method further involves generating a 3D model of the object based on the selected subset of the images and depth data corresponding to each of the images of the selected subset. For example, the 3D model may be a 3D mesh representation or a 3D point cloud. In some implementations, the 3D model data could be a 3D representation representing the surfaces in a 3D environment using a 3D point cloud with associated semantic labels. In some implementations, the 3D model data is a 3D reconstruction mesh using a meshing algorithm based on depth information detected in the generated environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room and/or object(s) within a room (e.g., furniture, keyboard on a table, a chair, etc.).

In some implementations, the exemplary method further involves displaying the captured physical environment, and providing a feedback mechanism including highlighting areas on the object in the displayed captured physical environment that have already been captured. For example, a flashlight-type highlight can be used to show the user on a display of a user device the portion or portions of the object that have been accurately scanned, and show in darker shaded regions on the object that need to be scanned further by acquiring additional images.

In some implementations, the exemplary method further involves assessing projection speeds of pixels of the object, which depend on both device motion and distance of the corresponding object pixels. In some implementations, selecting the subset of the images (e.g., "keyframes") based on assessing the images with respect to motion-based defects based on device motion and depth data includes determining a projection speed of particular pixels associated with the object. In some implementations, the particular pixels can correspond to an identified object, a generated 3D bounding box associated with the object, a center of the camera view, or the like. In some implementations, determining the projection speed of a pixel associated with the object includes determining a pixel's speed based on a current motion of the camera and a distance of the pixel from the camera.

In some implementations, the exemplary method further involves selecting the keyframes (e.g., subset of images) based on a distance range, an angle range, or whether they include the object or particular features of the object. For example, in some implementations, selecting the subset of the images further includes determining which of the images captured by the camera are within a distance range, and updating the subset of the images to not include the images captured by the camera that are outside of the distance range. Additionally, or alternatively, in some implementations, selecting the subset of the images further includes determining which of the images captured by the camera are within an angle range, and updating the subset of the images to not include the images captured by the camera that are outside of the angle range. Additionally, or alternatively, in some implementations, selecting the subset of the images based on assessing the images with respect to motion-based defects based on device motion and depth data includes selecting the subset of the images that include the object or particular features of the object.

In some implementations, the exemplary method further involves selecting the keyframes (e.g., subset of images) based on relevance criteria for detecting relevance to ensure that depth measurements are in the center of the image (e.g., corresponding to a target reticle) and within a minimum distance from the object or corresponding preliminary object model (e.g., 3D mesh, 3D point-cloud, 3D bounding box, etc.). For example, in some implementations selecting the subset of the images based on assessing the images with respect to motion-based defects based on device motion and depth data includes determining a preliminary object model corresponding to the object, determining an edge of the preliminary object model, determining which of the images captured by the camera include a distance of a center of view of the camera to the edge of the preliminary object model that are within an object model distance threshold, and updating the subset of the images to not include the images captured by the camera that are outside of the object model distance threshold. The relevance criteria that selects keyframes that are within a range of the center of image maintains (e.g., keeps) images that are close to each other (e.g., contiguity criteria). Sudden movements or sudden shift of capture of the region of interest (ROI) immediately makes the aforementioned criteria fail, avoiding taking irrelevant pictures.

In some implementations, the device includes a user interface, and during the movement of the device, the user interface displays the captured physical environment including the object (e.g., a live video stream), and a preliminary 3D model of the object based on the sensor data. In some implementations, the preliminary 3D model is generated during the movement of the device based on the selected subset of images, and the preliminary 3D model is displayed simultaneously with the images of the physical environment captured via the camera on the device (e.g., a picture-in-picture overlaid on the live video stream).

In some implementations, the generated 3D model of the object is based on generating a mesh, a 3D point cloud, or a voxel representation of the object. In some implementations, the sensor data includes depth data (e.g., RGB-D) and light intensity image data (e.g., RGB) of the physical environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
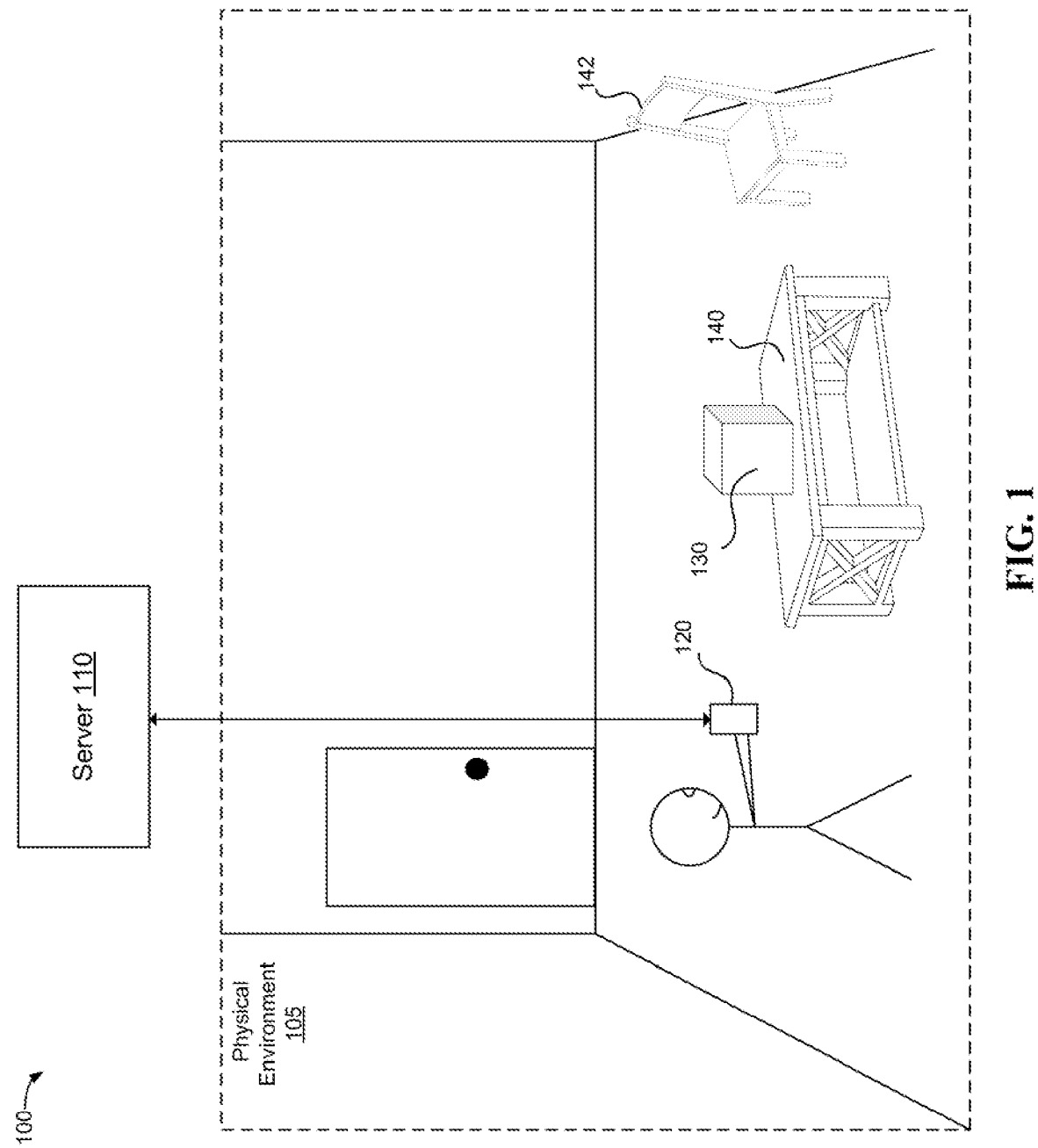
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes object 130, table 140, chair 142. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user 102 wears the device 120 on his/her head. As such, the device 120 may include one or more displays provided to display content. For example, the device 120 may enclose the field-of-view of the user 102. In some implementations, the device 120 is replaced with a chamber, enclosure, or room configured to present content in which the user 102 does not wear or hold the device 120.

Figure 2:
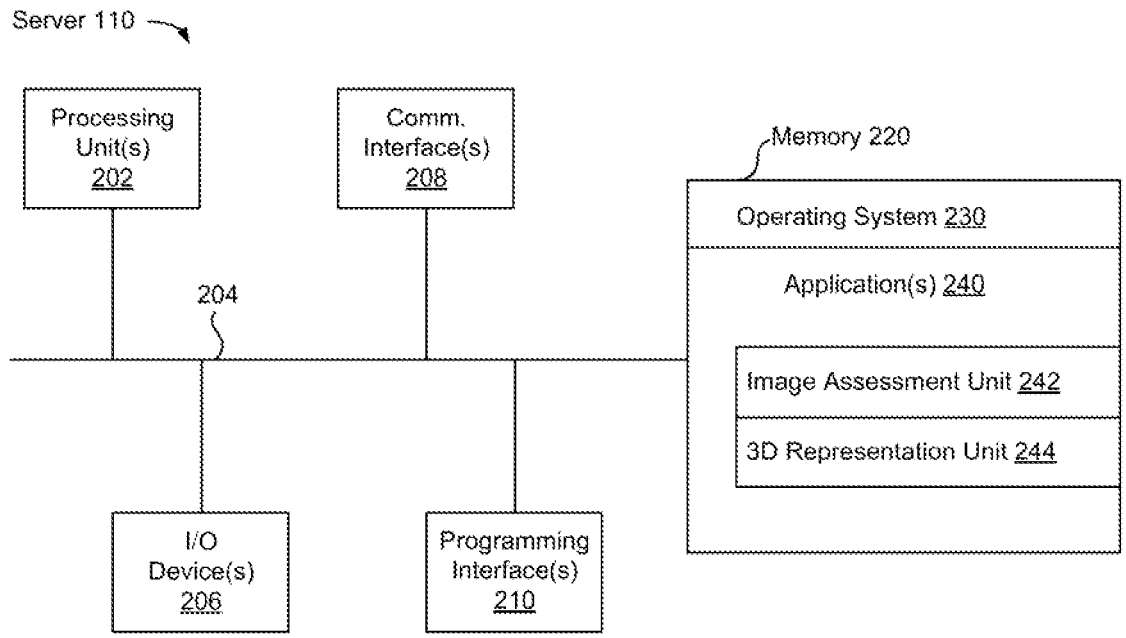
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include an image assessment unit 242 and a 3D representation unit 244. The image assessment unit 242 and the 3D representation unit 244 can be combined into a single application or unit or separated into one or more additional applications or units.

The image assessment unit 242 is configured with instructions executable by a processor to obtain sensor data (e.g., image data such as light intensity data, depth data, camera position information, etc.) and determine and select a subset of the sensor data based on assessing the images with respect to motion-based defects based on device motion and depth data using one or more of the techniques disclosed herein. For example, the image assessment unit 242 analyzes RGB images from a light intensity camera with a sparse depth map from a depth camera (e.g., time-of-flight sensor) and other sources of physical environment information (e.g., camera positioning information from a camera's SLAM system, VIO, or the like) to select a subset of sensor information for 3D reconstruction.

The 3D representation unit 244 is configured with instructions executable by a processor to obtain the selected subset of information and generate a 3D model using one or more techniques disclosed herein. For example, the 3D representation unit 244 obtains the subset of sensor information from the image assessment unit 242, obtains segmentation data (e.g., RGB-S data), other sources of physical environment information (e.g., camera positioning information), and generates a 3D model (e.g., a 3D mesh representation, a 3D point cloud with associated semantic labels, or the like).

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
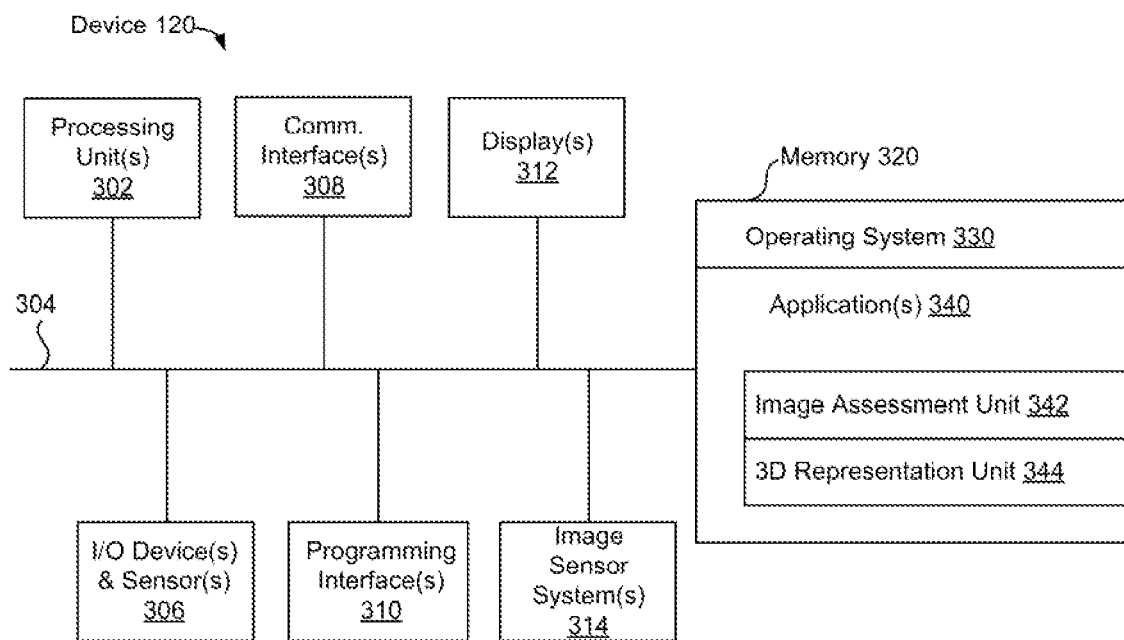
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 includes a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include an image assessment unit 342 and a 3D representation unit 344. The image assessment unit 342 and the 3D representation unit 344 can be combined into a single application or unit or separated into one or more additional applications or units.

The image assessment unit 342 is configured with instructions executable by a processor to obtain sensor data (e.g., image data such as light intensity data, depth data, camera position information, etc.) and determine and select a subset of the sensor data based on assessing the images with respect to motion-based defects based on device motion and depth data using one or more of the techniques disclosed herein. For example, the image assessment unit 342 analyzes RGB images from a light intensity camera with a sparse depth map from a depth camera (e.g., time-of-flight sensor) and other sources of physical environment information (e.g., camera positioning information from a camera's SLAM system, VIO, or the like) to select a subset of sensor information for 3D reconstruction.

The 3D representation unit 344 is configured with instructions executable by a processor to obtain the selected subset of information and generate a 3D model using one or more techniques disclosed herein. For example, the 3D representation unit 344 obtains the subset of sensor information from the image assessment unit 342, obtains segmentation data (e.g., RGB-S data), other sources of physical environment information (e.g., camera positioning information), and generates a 3D model (e.g., a 3D mesh representation, a 3D point cloud with associated semantic labels, or the like).

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
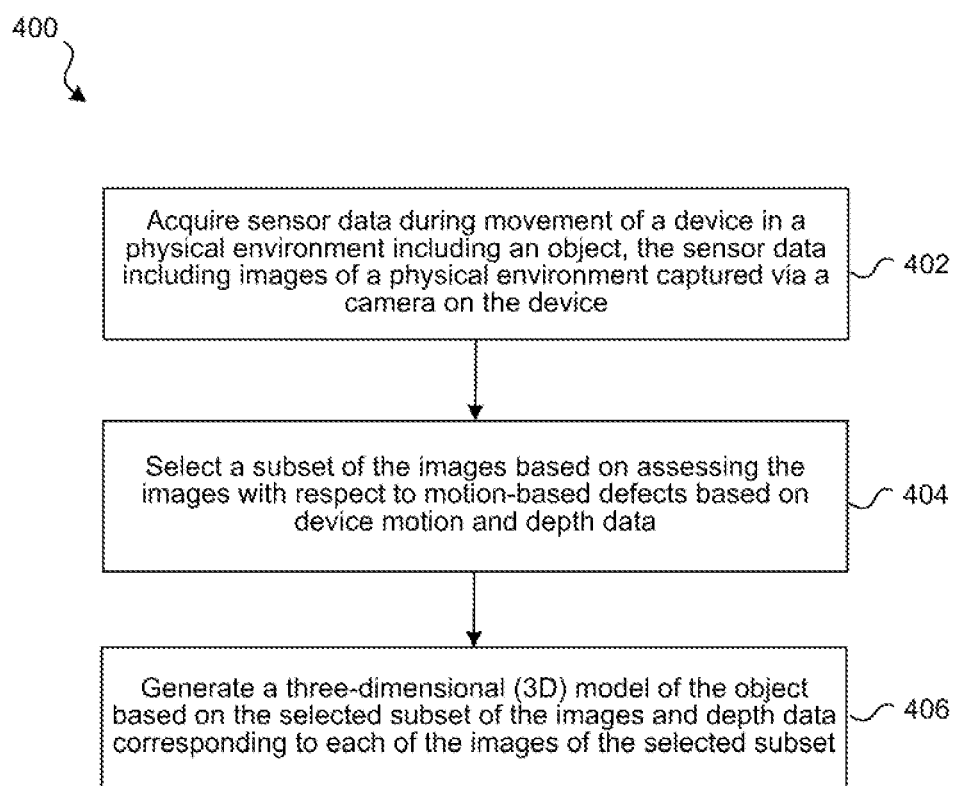
FIG. 4 is a flowchart representation of an exemplary method that generates a three-dimensional (3D) model of an object based on a subset of images and depth data corresponding to each of the images of the subset in accordance with some implementations.

FIG. 4 is a flowchart representation of an exemplary method 400 that generates a 3D model using a selected subset of image data and depth data in accordance with some implementations. In some implementations, the method 400 is performed by a device (e.g., server 110 or device 120 of FIGS. 1-3), such as a mobile device, desktop, laptop, or server device. The method 400 can be performed on a device (e.g., device 120 of FIGS. 1 and 3) that has a screen for displaying images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). The 3D model creation process of method 400 is illustrated with reference to FIGS. 5-6.

At block 402, the method 400 acquires sensor data during movement of the device in a physical environment including an object, where the sensor data includes images of a physical environment captured via a camera on the device (e.g., image sensor systems 314 of the device 120). For example, a user captures video while walking around the room to capture images of different parts of the object from multiple perspectives. During the movement of the device, the user interface may display the captured environment including the object and provide feedback such as flashlight-type highlight showing the areas that have already been captured. In some implementation the user interface may show a preliminary 3D model of the object.

The sensor data can include depth data. The depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time-of-flight (ToF), and the like. Various techniques may be applied to acquire depth image data to assign each portion (e.g., at a pixel level) of the image. For example, voxel data (e.g., a raster graphic on a 3D grid, with the values of length, width, and depth) may also contain multiple scalar values such as opacity, color, and density. In some implementations, depth data is obtained from sensors or 3D models of the content of an image. Some or all of the content of an image can be based on a real environment, for example, depicting the physical environment 105 around the device 120. Image sensors may capture images of the physical environment 105 for inclusion in the image and depth information about the physical environment 105. In some implementations, a depth sensor on the device 120 determines depth values for voxels that are determined based on images captured by an image sensor on the device 120.

At block 404, the method 400 selects a subset of the images (e.g., selecting images to be used as "keyframes") based on assessing the images with respect to motion-based defects based on device motion and depth data. For example, an image assessment unit (e.g., image assessment unit 242 of FIG. 2, and/or image assessment unit 342 of FIG. 3) assesses motion-based defects by estimating projection speed of particular pixels (e.g., pixels corresponding to an identified object, a 3D bounding box, a center of the camera view, etc.). In some implementations, assessing motion-based defects involves estimating projection speed of particular pixels. For example, pixels corresponding to an identified object, a 3D bounding box, a center of the camera view, or the like, can be assessed for motion-based defects at each frame or for subsets of frames. In some implementations, projection speed may be determined by determining a pixel's speed given the current motion of the camera and the distance of the pixel from the camera, as further illustrated with reference to FIGS. 6A-6D.

Additionally, or alternatively, in some implementations, the images may additionally be selected based on having been captured from within a desired distance range and/or within an angle range. For example, the relative angle of the object surface towards the camera with respect to the center of the field of view of the camera (e.g., as pointed by the reticle of the camera). The processes for angle assessment described herein evaluates the presence of grazing angles (e.g., a surface inclined more than 60 degrees) in the central region of the camera. A picture can be considered relevant (e.g., selected as a keyframe image) if the surface angle is below a certain angle threshold, since grazing angle pictures are not suitable for reconstruction. For example, the grazing angle criteria of 60 degrees or more of surface inclination between camera and object, samples are considered relevant if they are closer than 10 cm (an object edge distance threshold) from the captured geometry's borders.

Additionally, or alternatively, in some implementations, images may be selected to ensure that the images include the object or particular object features (e.g., an edge of an object, a closest point of the object to the camera, a recognized mark such as a brand name and/or symbol, or the like). In some implementations, a picture-in-picture preview may be displayed during the movement of the device based on the selected subset of the images.

In some implementations, the exemplary method further involves selecting the keyframes (e.g., subset of images) based on relevance criteria for detecting relevance to ensure that depth measurements are in the center of the image (e.g., corresponding to a target reticle) and within a minimum distance from the object or corresponding preliminary object model (e.g., 3D mesh, 3D point-cloud, 3D bounding box, etc.). For example, in some implementations selecting the subset of the images based on assessing the images with respect to motion-based defects based on device motion and depth data includes determining a preliminary object model corresponding to the object, determining an edge of the preliminary object model, determining which of the images captured by the camera include a distance of a center of view of the camera to the edge of the preliminary object model that are within an object model distance threshold, and updating the subset of the images to not include the images captured by the camera that are outside of the object model distance threshold. The relevance criteria that selects keyframes that are within a range of the center of image maintains (e.g., keeps) images that are close to each other (e.g., contiguity criteria). Sudden movements or sudden shift of capture of the region of interest (ROI) immediately makes the aforementioned criteria fail, avoiding taking irrelevant pictures.

At block 406, the method 400 generates a 3D model of the object based on the selected subset of the images and depth data corresponding to each of the images of the selected subset. For example, the 3D model may be a 3D mesh representation or a 3D point cloud. In some implementations, the 3D model data could be a 3D representation representing the surfaces in a 3D environment using a 3D point cloud with associated semantic labels. In some implementations, the 3D model data is a 3D reconstruction mesh using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., object 130, table 140, chair 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In use, for the process 400, a user may scan an object in a room with a device (e.g., a smartphone such as device 120) and the processes described herein would capture sensor data (e.g., image data such as light intensity data, depth data, camera position information, etc.), assess the images with respect to motion-based defects, select a subset of the sensor data based on the assessment, and provide a 3D representation for the object as it is being scanned by the user. In some implementations, the 3D representation may be automatically displayed and updated on the user device overlaid during a live camera feed. In some implementations, the 3D representation may be provided after some type of user interaction after scanning the physical environment with more than one object identified. For example, the user may be shown options of identified objects, and the user may select or click on the particular object that the user wants included in the 3D representation, and the 3D representation would then be displayed with the selected object. Thus, as shown and discussed below with reference to FIGS. 5-6, the image assessment unit (e.g., image assessment unit 242 of FIG. 2, and/or image assessment unit 342 of FIG. 3) identifies a subset of images that are to be utilized by a 3D representation unit (e.g., 3D representation unit 244 of FIG. 2, and/or 3D representation unit 344 of FIG. 3).

Figure 5:
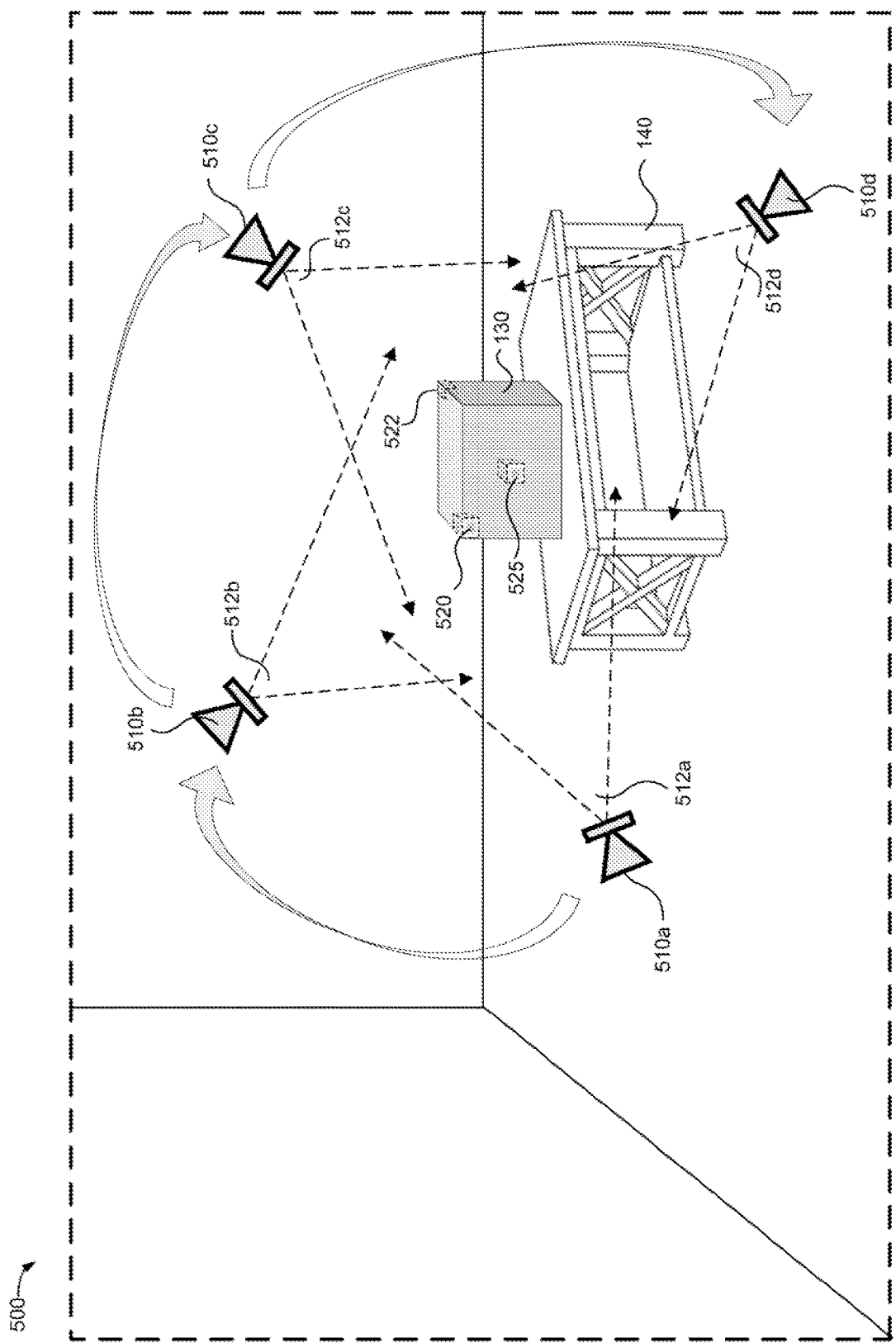
FIG. 5 is a block diagram illustrating example fields of view of a camera with respect to an object in a physical environment in accordance with some implementations.

FIG. 5 is a block diagram of an example operating environment 500 illustrating example fields of view of a camera (e.g., image sensor systems 314 of the device 120) with respect to an object (e.g., object 130) in a physical environment in accordance with some implementations. In this example, the example operating environment 500 illustrates an environment that includes a device 510, an object 130, and a table 140 from the physical environment 105 of FIG. 1. The device 510 is shown at four different camera views, device 510a, with a field of view 512a, device 510b, with a field of view 512b, device 510c, with a field of view 512c, and device 510d, with a field of view 512d. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 500 includes a device 510.

In some implementations, the device 510 may include one or more depth sensors (e.g., a structured light, a time-of-flight, or the like). As shown in FIG. 5, the device 510 is angled towards the object 130. The object 130 is shown with two reference voxels (e.g., reference pixels) 520 and 522. The reference voxel 520 being a closest voxel on the object with respect to the field of view 512a of the device 510a, and reference voxel 522 being an additional voxel that is further away from the field of view 512a of the device 510a. The object 130 is additionally shown with a center reference voxel (e.g., reference pixel) 525 that may be used by the process described herein in as an estimation of the center of the object to be used for each camera view. The reference voxels 520, 522, and 525 are for illustrative purposes only. As discussed herein, determining projection speeds of voxels between different camera views may be associated directly with the object 130, as illustrated, or with a 3D bounding box associated with the object, a particular voxel that is determined to be a center of a forward facing surface of the object, a center of the field of view of the camera, or the like. As illustrated, a user is acquiring sensor data around the object 130 at different camera views. In some implementations, the user is constantly acquiring the image data as a live video, thus, as the user moves the device 510 from field of view 512a to field of view 512b, a plurality of images from the sensor data can be captured (e.g., a live video feed). Projection speeds may be determined by determining a pixel's speed between image frames given the current motion of the camera and the distance of the pixel from the camera. Each of the fields of view 512a-512d are further illustrated with reference to FIGS. 6A-6D respectively.

Figure 6A:
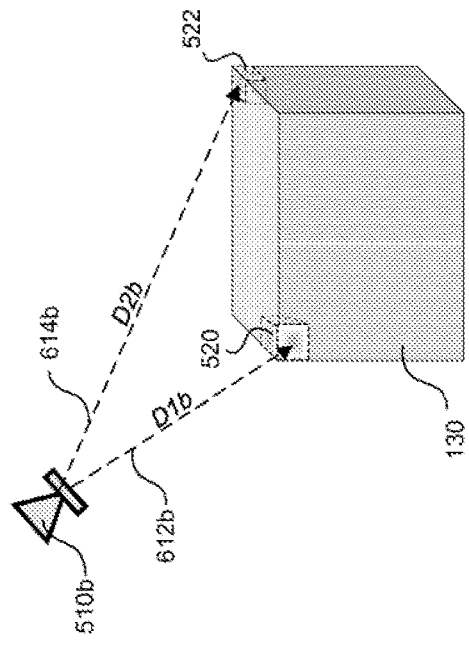
FIGS. 6A-6D are block diagrams illustrating example distances of a camera with respect to an object in a physical environment in accordance with some implementations.
Figure 6B:
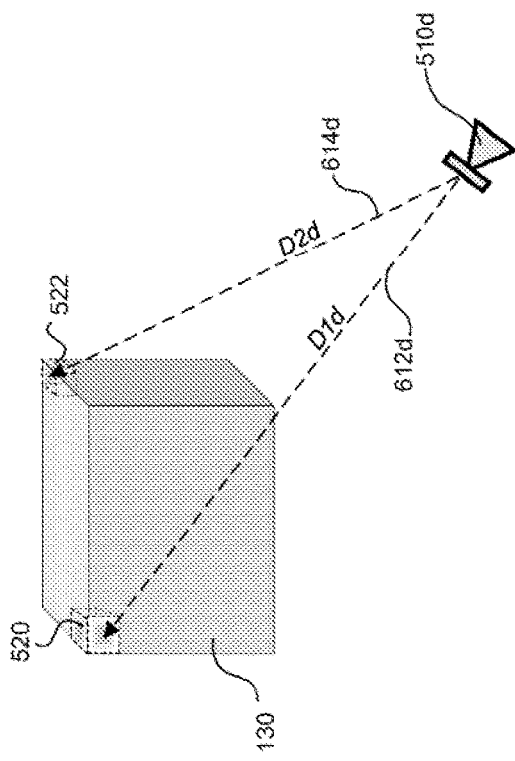
Figure 6C:
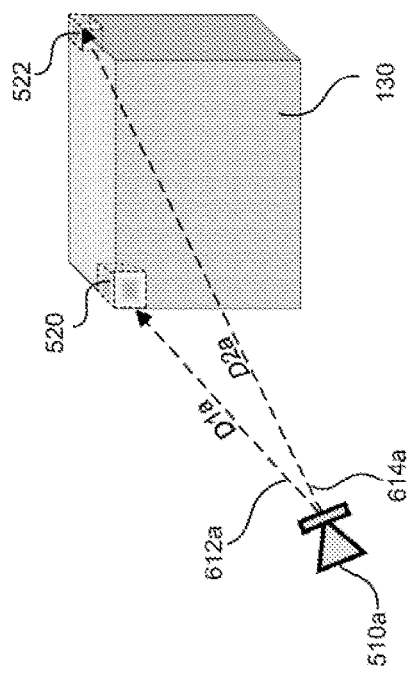
Figure 6D:
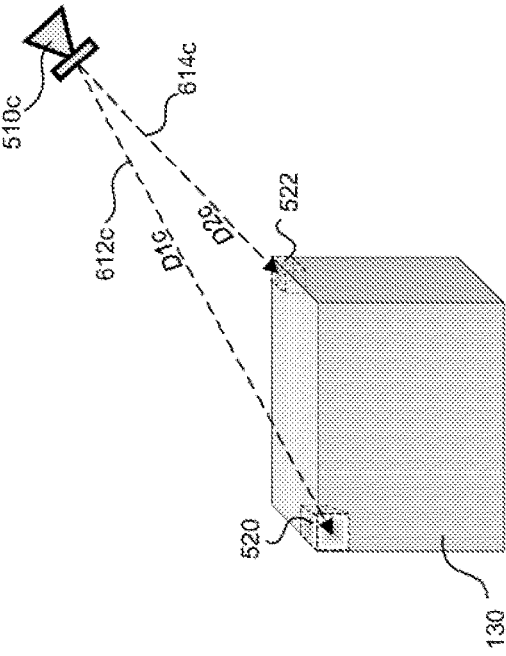

FIGS. 6A-6D are block diagrams illustrating example fields of view (fields of view 512a-512d) captured by the device 510 (e.g., device 510a-510d) in FIG. 5 in accordance with some implementations. In particular, FIG. 6A is a block diagram of device 510a of FIG. 5, and the associated distances, measurement D1a 612a and measurement D2a 614a, to the reference voxels 520 and 522, respectively. FIG. 6B is a block diagram of device 510b of FIG. 5, and the associated distances, measurement D1b 612b and measurement D2b 614b, to the reference voxels 520 and 522, respectively. FIG. 6C is a block diagram of device 510c of FIG. 5, and the associated distances, measurement D1c 612c and measurement D2c 614c, to the reference voxels 520 and 522, respectively. FIG. 6D is a block diagram of device 510d of FIG. 5, and the associated distances, measurement D1*d* 612*d* and measurement D2*d* 614*d*, to the reference voxels 520 and 522, respectively.

Projection speeds may be determined by determining a pixel's speed between image frames given the current motion of the camera and the distance of the pixel from the camera. The measurement data (e.g., measurement D1*a* 612*a*) is an example distance from the center of a camera for the device 510*a* to reference voxel 520 at a first time, and measurement D1*b* 612*b* is an example distance measurement from the center of a camera for the device 510*a* to the reference voxel 520 at a second time. Thus the speed of the camera movement between the two image frames of FIG. 6A at the first time and FIG. 6B at the second time can be used to determine an estimated projection speed of the pixel with respect to the camera movement to determine whether the speed would create motion-based defects in the images and thus not be included in the subset of image data. In some implementations, desired camera overlap for taking an image is roughly twenty percent of the device screen (e.g., smallest of the image dimensions: width or height). For example, a device camera with view dimensions of 3176× 4224 and a FOV of ~67 degrees, the view angle variation is ~7.5 degrees. Projection speed that is acceptable for capture depends on the camera exposure times and response. In an example implementation, capture can be considered free of blur if the projection speed is below the projection speed threshold. For example, a 30 Hz aforementioned camera (e.g., 30 frames captured per second), one third of the screen per second (e.g., the projection speed threshold) can be considered an acceptable projection speed. The 30 Hz aforementioned camera translates to ~900 pixels/second or 30 pixels/frame. In some implementations, high-speed cameras (e.g., 60 Hz, 120 Hz, etc.) may have higher tolerances.

In some implementations, the measurement data (e.g., measurement D1*a* 612*a*) is an example distance from the center of a camera for the device 510*a* to reference voxel 520, and measurement D2*a* 614*a* is an example distance measurement from the center of a camera for the device 510*a* to reference voxel 522. The distance measurements can then be utilized by the image assessment unit to determine whether the object that is to be modeled is within an apparent distance range (e.g., within a distance threshold of 3 meters, or the like) in the images, such that those particular images would be included in the subset data. In some implementations, measurement data can include an angle created between two respective measurements (e.g., measurement D1*a* 612*a* and measurement D2*a* 614*a*, and the subset of data can be limited to data that includes an angle that is above a few degrees (e.g., five degrees) to help the image assessment unit to determine that the images include higher quality images. A small angle between the measurement data may signify that the object is not a centered view of the camera 510*a*. The measurement data may be based on depth data and the 3D coordinates of the reference voxels with respect to the device 520 The measurement data is used, as discussed herein, to determine whether the sensor data includes motion-based defects and whether or not to include the sensor data from each field of view in the selected subset of images. The measurement data can be used to determine a pixel's speed from one image frame to the next, or to determine the measurement data is within a desired distance range, or whether the camera angle(s) are with a desired angle range. As discussed herein, images may also be selected to ensure that the images include the object or particular object features.

Additionally, or alternatively, in some implementations, the images may additionally be selected based on having been captured from within a desired distance range and/or within an angle range. For example, the relative angle of the object surface towards the camera with respect to the center of the field of view of the camera (e.g., as pointed by the reticle of the camera). The processes for angle assessment described herein evaluates the presence of grazing angles (e.g., a surface inclined more than 60 degrees) in the central region of the camera. A picture can be considered relevant (e.g., selected as a keyframe image) if the surface angle is below a certain angle threshold, since grazing angle pictures are not suitable for reconstruction. For example, the grazing angle criteria of 60 degrees or more of surface inclination between camera and object, samples are considered relevant if they are closer than 10 cm (an object edge distance threshold) from the captured geometry's borders.

Figure 7:
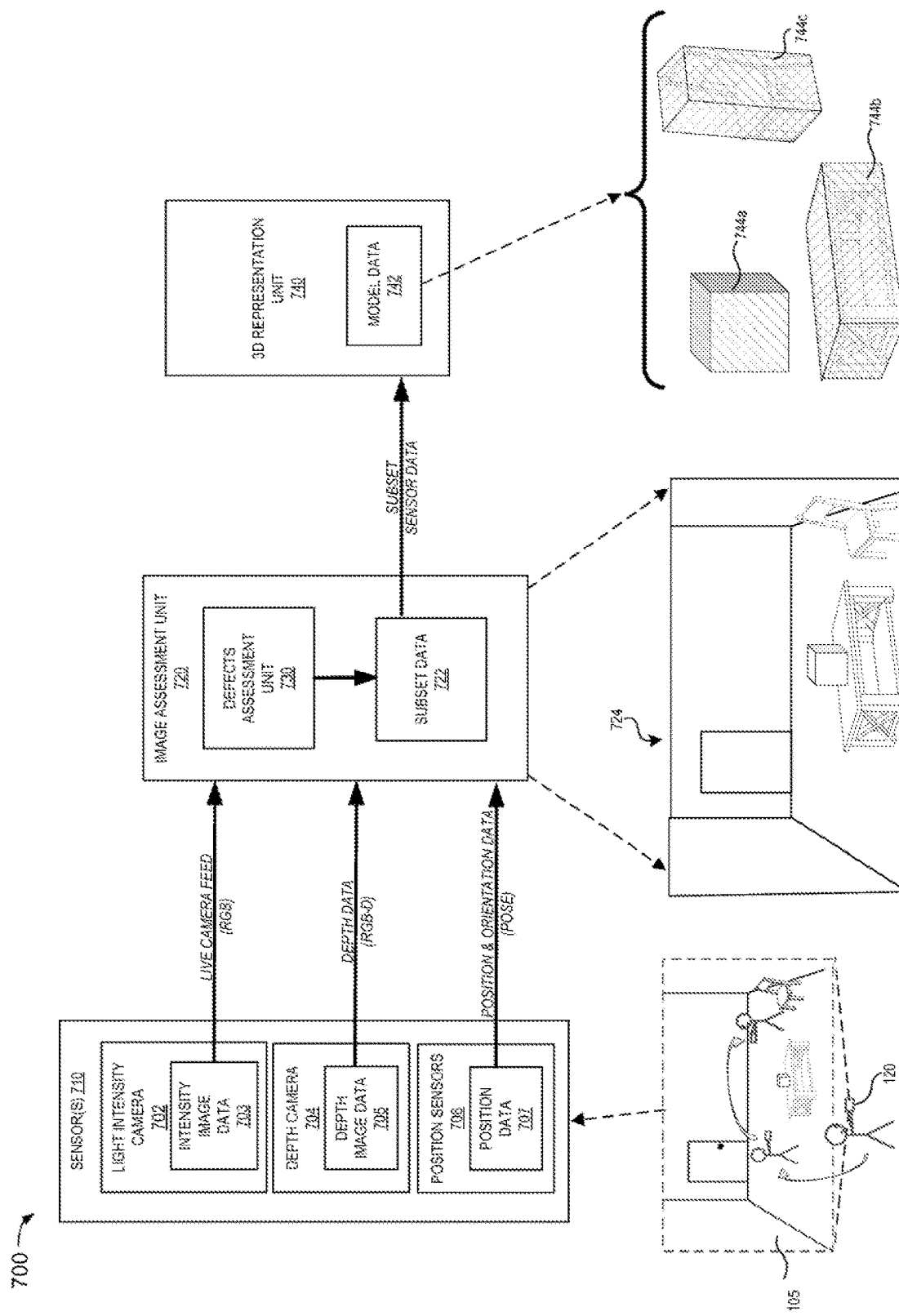
FIG. 7 is a system flow diagram of an example generation of a 3D model based on a subset of images and depth data corresponding to each of the images of the subset information according to some implementations.

FIG. 7 is a system flow diagram of an example environment 700 in which a system can generate 3D model data based on a selected subset of the images and depth data corresponding to each of the images of the subset. In some implementations, the system flow of the example environment 700 is performed on a device (e.g., server 110 or device 120 of FIGS. 1-3), such as a mobile device, desktop, laptop, or server device. The system flow of the example environment 700 can be displayed on a device (e.g., device 120 of FIGS. 1 and 3) that has a screen for displaying images and/or a screen for viewing stereoscopic images such as a head-mounted display (HMD). In some implementations, the system flow of the example environment 700 is performed on processing logic, including hardware, firmware, software, or a combination thereof. In some implementations, the system flow of the example environment 700 is performed on a processor executing code stored in a non-transitory computer-readable medium (e.g., a memory).

The system flow of the example environment 700 acquires light intensity image data 703 (e.g., live camera feed such as RGB from light intensity camera 702), depth image data 705 (e.g., depth image data such as RGB-D from depth camera 704), and other sources of physical environment information (e.g., camera positioning information 707 such as position and orientation data from position sensors 706) of a physical environment (e.g., the physical environment 105 of FIG. 1), assesses the images with respect to motion-based defects and selects a subset of the sensor data based on the assessment (e.g., the image assessment unit 720), and generates 3D model data 742 from the subset sensor data (e.g., the 3D representation unit 740).

In an example implementation, the environment 700 includes an image composition pipeline that acquires or obtains data (e.g., image data from image source(s)) for the physical environment. Example environment 700 is an example of acquiring image sensor data (e.g., light intensity data, depth data, and position information) for a plurality of image frames. The image source(s) may include a depth camera 704 that acquires depth data 705 of the physical environment, a light intensity camera 702 (e.g., RGB camera) that acquires light intensity image data 703 (e.g., a sequence of RGB image frames), and position sensors to acquire positioning information. For the positioning information 707, some implementations include a visual inertial odometry (VIO) system to determine equivalent odometry information using sequential camera images (e.g., light intensity data 703) to estimate the distance traveled. Alternatively, some implementations of the present disclosure may include a SLAM system (e.g., position sensors 706). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 700 includes an image assessment unit 720 that is configured with instructions executable by a processor to obtain sensor data (e.g., image data such as light intensity data, depth data, camera position information, etc.) and select a subset of the sensor data (e.g., subset data 722) using one or more of the techniques disclosed herein. In some implementations, image assessment unit 720 includes a defects assessment unit 730 that is configured with instructions executable by a processor to analyze the image information with respect to motion-based defects based on device motion and depth data. For example, the defects assessment unit 730 of the image assessment unit 740 (e.g., image assessment unit 242 of FIG. 2 and/or image assessment unit 342 of FIG. 3) analyzes RGB images from a light intensity camera 702 with a sparse depth map from a depth camera 704 (e.g., time-of-flight sensor) and other sources of physical environment information (e.g., camera positioning information 707 from a camera's SLAM system, VIO, or the like such as position sensors 706) to select a subset of sensor information for 3D reconstruction.

The image assessment unit 720 selects a subset of the sensor data from sensors 710 (e.g., selecting images to use as "keyframes") based on the defects assessment unit 730 assessing the images with respect to motion-based defects based on device motion and depth data. In some implementations, assessing motion-based defects involves estimating projection speed of particular pixels as illustrated in FIGS. 6A-6D. For example, pixels corresponding to an identified object, a 3D bounding box, a center of the camera view, or the like, can be analyzed for motion-based defects at each frame. In some implementations, projection speed may be determined by determining a pixel's speed given the current motion of the camera and the distance of the pixel from the camera in subsequent frames.

Additionally, or alternatively, in some implementations, the images may be selected for the subset data based on having been captured from within a desired distance range and/or within a desired angle range. For example, the subset data 722 may be configured to be limited to include image data when the measurement data (e.g., measurement D1a 612a of FIG. 6A or the like) is within a distance threshold. In particular, for a desired distance range example, the subset data may be configured to only include images of the object (e.g., object 130), when the measurement data (e.g., measurement D1a 612a, the distance from the camera 510a and the object 130) is less than or equal to three meters. For a desired angle range example, the subset data may only include images of the object (e.g., object 130), when the angle between two measurements in the same field of view (e.g., measurement D1a 612a and measurement D2a 614a the object 130) with respect to the two reference voxels 520 and 522 is greater than or equal to five degrees. In other words, when the angle is less than five degrees, there is not much separation between the two reference voxels and therefore the system can determine that there is sufficient overlap between the frames. For example, there is sufficient difference between the images that the surfaces of the object can be computed accurately. Images captured within a small view angle difference are determined to have a good overlap but not sufficient enough information to extract accurate surface data. Images captured with too large view angle difference do not have sufficient overlap even if there is a high degree of difference to compute surface information. For example, since image capture is live (e.g., a live video stream), difference increases gradually overtime, allowing a certain threshold (e.g., a distance threshold) to act as a "picture trigger" (e.g., a trigger to select those particular keyframes).

Additionally, or alternatively, in some implementations, images may be selected to ensure that the images include the object or particular object features (e.g., an edge of an object, a closest point of the object to the camera, a recognized mark such as a brand name and/or symbol, or the like). For example, the image assessment unit 720 may analyze the image information, determine a particular feature of an object, and limit the subset of images that include those features in order to ensure that only images in the subset that are included in the subset data 722 send to the 3D reconstruction unit 740 are included. Thus, limiting the data set in the subset data 722 to only images that include the particular object. In some implementations, a picture-in-picture preview may be displayed during the movement of the device based on the selected subset of the images, as illustrated with reference to FIG. 8.

In an example implementation, the environment 700 further includes a 3D representation unit 740 that is configured with instructions executable by a processor to obtain the subset sensor data from the image assessment unit 720 and generate a 3D model data 742 using one or more techniques. For example, the 3D representation unit 740 (e.g., 3D representation unit 244 of FIG. 2 and/or 3D representation unit 344 of FIG. 3) generates 3D models 744a-744c for each detected object (e.g., 3D bounding box 744a for object 130, 3D bounding box 744b for table 140, and 3D bounding box 744c for chair 142).

The 3D model data could be 3D representations 744a-744c representing the surfaces in a 3D environment using a 3D point cloud with associated semantic labels. The 3D representations 744a-744c are illustrated as 3D bounding boxes for the object 130, table 140, and chair 142, respectively. In some implementations, the 3D model data 742 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., object 130, table 140, chair 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In some implementations, the 3D representation unit includes an integration unit that is configured with instructions executable by a processor to obtain the subset of image data (e.g., light intensity data 703, depth data 705, etc.) and positioning information (e.g., camera pose information 707 from position sensors 706) and integrate (e.g., fuse) the subset of image data using one or more known techniques. For example, the image integration unit receives a subset of depth image data 705 (e.g., sparse depth data) and a subset of intensity image data 703 (e.g., RGB) from the image sources (e.g., light intensity camera 702 and depth camera 704), and integrates the subset of image data and generates 3D data. The 3D data can include a dense 3D point cloud (e.g., imperfect depth maps and camera poses for a plurality of image frames around the object) that is sent to the 3D representation unit 740. The 3D data can also be voxelized.

In some implementations, the 3D representation unit includes a semantic segmentation unit that is configured with instructions executable by a processor to obtain a subset the light intensity image data (e.g., light intensity data 703) and identify and segment wall structures (wall, doors, windows, etc.) and objects (e.g., person, table, teapot, chair, vase, etc.) using one or more known techniques. For example, the segmentation unit receives a subset of intensity image data 703 from the image sources (e.g., light intensity camera 702), and generates segmentation data (e.g., semantic segmentation data such as RGB-S data). In some implementations, a segmentation unit uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

Figure 8:
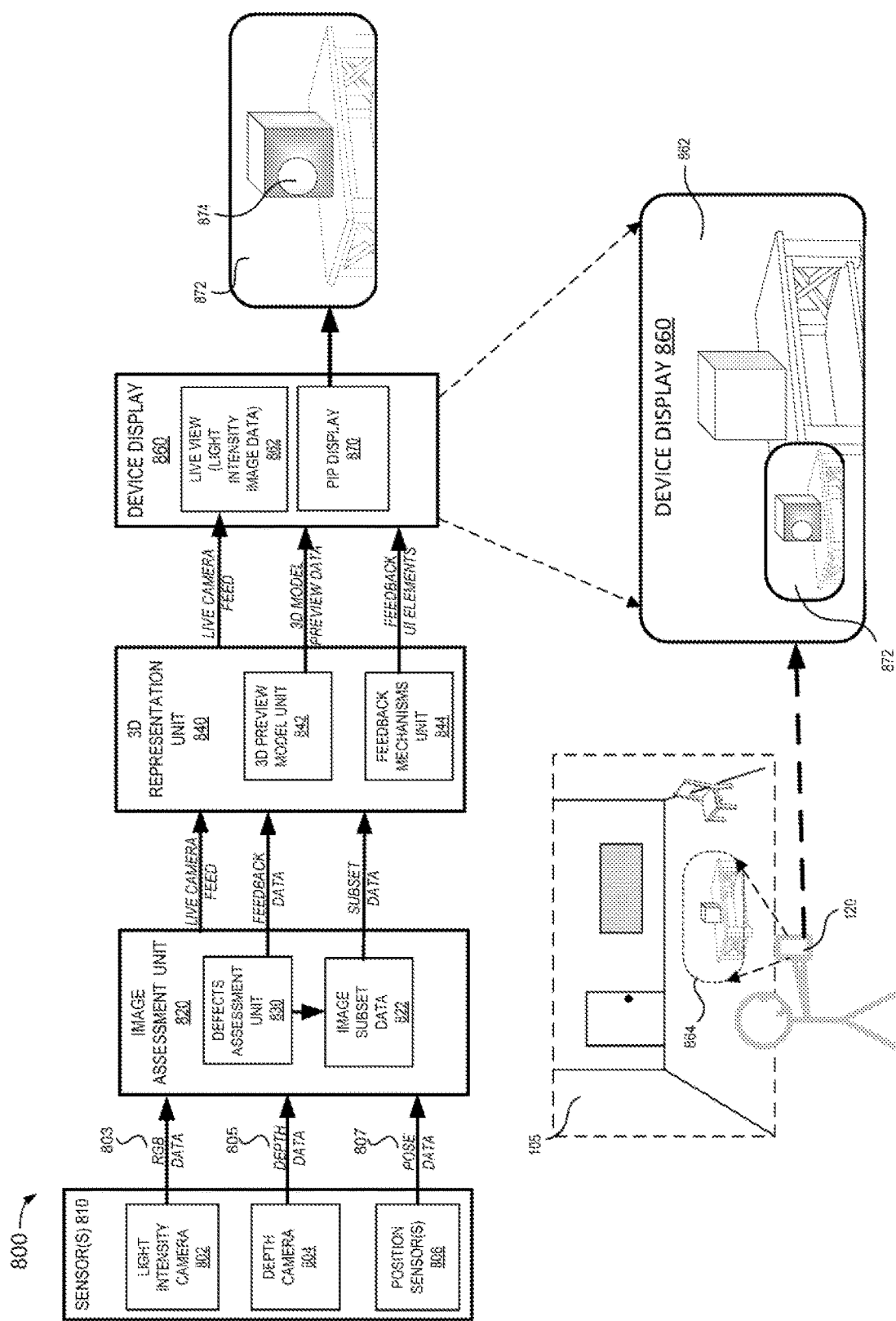
FIG. 8 is a system flow diagram of an example generation of a live preview of a 3D model based on a subset of images and depth data corresponding to each of the images of the subset information according to some implementations.

FIG. 8 is a system flow diagram of an example environment 800 in which a system can generate and display a live preview of a 3D model (e.g., a 3D point cloud, a 3D mesh reconstruction, a 3D bounding box associated with an object, etc.) based on a subset of images and depth data corresponding to each of the images of the subset information according to some implementations. In some implementations, the system flow of the example environment 800 is performed on a device (e.g., server 110 or device 120 of FIGS. 1-3), such as a mobile device, desktop, laptop, or server device. The system flow of the example environment 800 can be displayed on a device (e.g., device 120 of FIGS. 1 and 3) that has a screen for displaying images and/or a screen for viewing stereoscopic images such as a head-mounted display (HMD). In some implementations, the system flow of the example environment 800 is performed on processing logic, including hardware, firmware, software, or a combination thereof. In some implementations, the system flow of the example environment 800 is performed on a processor executing code stored in a non-transitory computer-readable medium (e.g., a memory).

The system flow of the example environment 800 acquires light intensity image data 803 (e.g., live camera feed such as RGB from light intensity camera 802), depth image data 805 (e.g., depth image data such as RGB-D from depth camera 804), and other sources of physical environment information (e.g., camera positioning information 807 such as position and orientation data from position sensors 806) of a physical environment (e.g., the physical environment 105 of FIG. 1), assesses the images with respect to motion-based defects and selects a subset of the sensor data based on the assessment (e.g., the image assessment unit 820), generates 3D model preview data from the subset sensor data, and displays a live preview of the 3D model as it is being generated overlaid on a live camera view on a display of a device. In some implementations, the system flow of the example environment 800 includes generating and displaying feedback user interface elements to aid the user in acquiring the appropriate images.

In an example implementation, the environment 800 includes an image composition pipeline that acquires or obtains data (e.g., image data from image source(s)) for the physical environment. Example environment 800 is an example of acquiring image sensor data (e.g., light intensity data, depth data, and position information) for a plurality of image frames. The image source(s) may include a depth camera 804 that acquires depth data 805 of the physical environment, a light intensity camera 802 (e.g., RGB camera) that acquires light intensity image data 803 (e.g., a sequence of RGB image frames), and position sensors to acquire positioning information. For the positioning information 807, some implementations include a visual inertial odometry (VIO) system to determine equivalent odometry information using sequential camera images (e.g., light intensity data 803) to estimate the distance traveled. Alternatively, some implementations of the present disclosure may include a SLAM system (e.g., position sensors 806). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 800 includes an image assessment unit 820 that is configured with instructions executable by a processor to obtain sensor data (e.g., image data such as light intensity data, depth data, camera position information, etc.) and select a subset of the sensor data (e.g., subset data 822) using one or more of the techniques disclosed herein. In some implementations, image assessment unit 820 includes a defects assessment unit 830 that is configured with instructions executable by a processor to analyze the image information with respect to motion-based defects based on device motion and depth data. For example, the defects assessment unit 830 of the image assessment unit 840 (e.g., image assessment unit 242 of FIG. 2 and/or image assessment unit 342 of FIG. 3) analyzes RGB images from a light intensity camera 802 with a sparse depth map from a depth camera 804 (e.g., time-of-flight sensor) and other sources of physical environment information (e.g., camera positioning information 807 from a camera's SLAM system, VIO, or the like such as position sensors 806) to select a subset of sensor information for 3D reconstruction for the live preview model. Additionally, the defects assessment unit 830 can be configured with instructions executable by a processor to generate feedback data for the live preview unit. The feedback data flags specific data or image sets that can later be used to create user interface elements to highlight to a user which portion(s) of the object have been captured sufficiently for 3D reconstruction, or alternatively, flag which portion(s) of the image need to be further captured. Feedback element 874 represents a flashlight type of user interface element that highlights for the user which portion of the object has been properly captured (e.g., turns brighter), compared to which portion of the object may need to be further imaged (e.g., is shades darker in the preview display).

The image assessment unit 820 selects a subset of the sensor data from sensors 810 (e.g., selecting images to use as "keyframes") based on the defects assessment unit 830 assessing the images with respect to motion-based defects based on device motion and depth data. In some implementations, assessing motion-based defects involves estimating projection speed of particular pixels as illustrated in FIGS. 6A-6D. For example, pixels corresponding to an identified object, a 3D bounding box, a center of the camera view, or the like, can be analyzed for motion-based defects at each frame. In some implementations, projection speed may be determined by determining a pixel's speed given the current motion of the camera and the distance of the pixel from the camera in subsequent frames.

Additionally, or alternatively, in some implementations, the images may be selected for the subset data based on having been captured from within a desired distance range and/or within a desired angle range. For example, the subset data 822 may be configured to be limited to include image data when the measurement data (e.g., measurement D1a 612a of FIG. 6A or the like) is within a distance threshold. In particular, for a desired distance range example, the subset data may be configured to only include images of the object (e.g., object 130), when the measurement data (e.g., measurement D1a 612a, the distance from the camera 510a and the object 130) is less than or equal to three meters. For a desired angle range example, the subset data may only include images of the object (e.g., object 130), when the angle between two measurements in the same field of view (e.g., measurement D1a 612a and measurement D2a 614a the object 130) with respect to the two reference voxels 520 and 522 is greater than or equal to five degrees. In other words, when the angle is less than five degrees, there is not much separation between the two reference voxels and thus the angle of the camera field of view must likely have the object in a peripheral view of the field of view, and not in the center of view.

Additionally, or alternatively, in some implementations, images may be selected to ensure that the images include the object or particular object features (e.g., an edge of an object, a closest point of the object to the camera, a recognized mark such as a brand name and/or symbol, or the like). For example, the image assessment unit 820 may analyze the image information, determine a particular feature of an object, and limit the subset of images that include those features in order to ensure that only images in the subset that are included in the subset data 822 send to the 3D reconstruction unit 840 are included. Thus, limiting the data set in the subset data 822 to only images that include the particular object. In some implementations, a picture-in-picture preview may be displayed during the movement of the device based on the selected subset of the images, as illustrated with reference to FIG. 8.

In an example implementation, the environment 800 further includes a 3D representation unit 840 that is configured with instructions executable by a processor to obtain the subset sensor data from the image assessment unit 820 and generate 3D preview model data 842 using one or more techniques. For example, the 3D representation unit 840 (e.g., 3D representation unit 244 of FIG. 2 and/or 3D representation unit 344 of FIG. 3) generates 3D model previews for each detected object (e.g., object 130, table 140, and chair 142).

The 3D model preview data could be 3D representations representing the surfaces in a 3D environment using a 3D point cloud with associated semantic labels. The 3D representations could be similar to 3D representations 744a-744c of FIG. 7 illustrated as 3D bounding boxes for the object 130, table 140, and chair 142, respectively. In some implementations, the 3D model preview data is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., object 130, table 140, chair 142, etc.).

Additionally, the 3D representation unit includes a feedback mechanisms unit 844 that obtains the feedback data from the defects assessment unit 830 and generates the feedback user interface elements. For example, feedback element 874 represents a flashlight type of user interface element that highlights for the user which portion of the object has been properly captured (e.g., turns brighter), compared to which portion of the object may need to be further imaged (e.g., is shaded darker in the preview display). The feedback user interface elements, the live camera feed, and the 3D model preview data are sent from the 3D representation unit 840 to the device display 860.

In an example implementation, the environment 800 further includes a device display 860 (e.g., display 312 of FIG. 3) that is configured to obtain feedback user interface element data, a live camera feed, and the 3D model preview data from the 3D representation unit 840, and generate a live view and a picture-in-picture (PIP) display of the 3D model (s) as the 3D model(s) are being generated using one or more techniques. For example, the device display 860 can display a live view 862 (e.g., light intensity image data 803), and a PIP display module 870 can generate and display a PIP preview 872. The PIP preview 872 can be iteratively updated as the 3D preview model unit 842 continuously updates the 3D preview model as the subset image data is acquired from the image assessment unit 820. Additionally, the PIP display module 870 can obtain the feedback user interface element data from the feedback mechanisms unit 844 and display the feedback user interface elements in the PIP preview 872. For example, the PIP preview 872 illustrates the feedback user interface element 874 (e.g., the flashlight highlight example described herein). As a user obtains images of an object, the system determines which portions of the object were efficiently obtained and show them as lighter shaded areas from the "flashlight", while showing the portions of the object that need to be further imaged in a darker shade. The feedback user interface elements aid the user in obtaining the images needed to be acquired for generating a 3D model of the object.

In some implementations, the image composition pipeline may include virtual content (e.g., a virtual box placed on the table 135 in FIG. 1) that is generated for an extended reality (XR) environment. In some implementations, the operating systems 230, 330 includes built in XR functionality, for example, including a XR environment application or viewer that is configured to be called from the one or more applications 240, 340 to display a XR environment within a user interface. For example, the systems described herein may include a XR unit that is configured with instructions executable by a processor to provide a XR environment that includes depictions of a physical environment including real physical objects and virtual content. A XR unit can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR unit that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor:
   acquiring depth data during movement of the device in a physical environment comprising an object;
   assessing the depth data with respect to motion-based defects based on the movement of the device;
   selecting a portion of the depth data based on the assessment of the depth data with respect to preventing motion-based defects within the portion of the depth data; and
   generating a three-dimensional (3D) model of the object based on the selected portion of the depth data.

2. The method of claim 1, further comprising:
   displaying the physical environment; and
   providing a feedback mechanism comprising highlighting areas on the object in the displayed physical environment that have already been captured.

3. The method of claim 1, wherein selecting the portion of the depth data based on assessing the depth data with respect to preventing motion-based defects based on the movement of the device comprises determining a projection speed of particular pixels associated with the object.

4. The method of claim 3, wherein the particular pixels are associated with pixels corresponding to an identification of the object, a 3D bounding box corresponding to the object, or a center of a view of a camera of the device.

5. The method of claim 3, wherein determining the projection speed of a pixel associated with the object includes determining a pixel's speed based on a current motion of a camera of the device and a distance of the pixel from the camera.

6. The method of claim 1, wherein selecting the portion of the depth data further includes:
determining which segments of the depth data that are within a distance range; and
updating the portion of the depth data to not include the segments of the depth data that are outside of the distance range.

7. The method of claim 1, wherein selecting the portion of the depth data further includes:
determining which segments of the depth data that are within an angle range; and
updating the portion of the depth data to not include the segments of the depth data that are outside of the angle range.

8. The method of claim 1, wherein selecting the portion of the depth data based on assessing the depth data with respect to preventing motion-based defects based on the movement of the device comprises:
determining a preliminary object model corresponding to the object;
determining an edge of the preliminary object model;
determining which segments of the depth data include a distance of a center of view of a camera of the device to the edge of the preliminary object model that are within an object model distance threshold; and
updating the portion of the depth data to not include segments of the depth data that are outside of the object model distance threshold.

9. The method of claim 1, wherein selecting the portion of the depth data based on assessing the depth data with respect to preventing motion-based defects based on the movement of the device comprises:
selecting segments of the depth data that includes the object or particular features of the object.

10. The method of claim 1, wherein the device includes a user interface, wherein, during the movement of the device, the user interface displays:
the physical environment including the object; and
a preliminary 3D model of the object based on the depth data.

11. The method of claim 10, wherein the preliminary 3D model is generated during the movement of the device based on the selected the portion of the depth data, and the preliminary 3D model is displayed simultaneously with images of the physical environment captured via a camera on the device.

12. The method of claim 1, wherein the generated 3D model of the object is based on generating a mesh, a 3D point cloud, or a voxel representation of the object based on the acquired depth data.

13. The method of claim 1, wherein acquiring the depth data during the movement of the device in the physical environment includes acquiring light intensity image data of the physical environment.

14. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
acquiring depth data during movement of the device in a physical environment comprising an object;
assessing the depth data with respect to motion-based defects based on the movement of the device;
selecting a portion of the depth data based on the assessment of the depth data with respect to preventing motion-based defects within the portion of the depth data; and
generating a three-dimensional (3D) model of the object based on the selected portion of the depth data.

15. The device of claim 14, further comprising:
displaying the physical environment; and
providing a feedback mechanism comprising highlighting areas on the object in the displayed physical environment that have already been captured.

16. The device of claim 14, wherein selecting the portion of the depth data based on assessing the depth data with respect to preventing motion-based defects based on the movement of the device comprises determining a projection speed of particular pixels associated with the object.

17. The device of claim 16, wherein the particular pixels are associated with pixels corresponding to an identification of the object, a 3D bounding box corresponding to the object, or a center of a view of a camera of the device.

18. The device of claim 16, wherein determining the projection speed of a pixel associated with the object includes determining a pixel's speed based on a current motion of a camera of the device and a distance of the pixel from the camera.

19. The device of claim 14, wherein selecting the portion of the depth data further includes:
determining which segments of the depth data that are within a distance range; and
updating the portion of the depth data to not include the segments of the depth data that are outside of the distance range.

20. A non-transitory computer-readable storage medium, storing computer-executable program instructions on a computer to perform operations comprising:
acquiring depth data during movement of a device in a physical environment comprising an object;
assessing the depth data with respect to motion-based defects based on the movement of the device;
selecting a portion of the depth data based on the assessment of the depth data with respect to preventing motion-based defects within the portion of the depth data; and
generating a three-dimensional (3D) model of the object based on the selected portion of the depth data.

* * * * *